(No Model.)
A. W. GREGORY.
BICYCLE CHAIN.
No. 575,477. Patented Jan. 19, 1897.
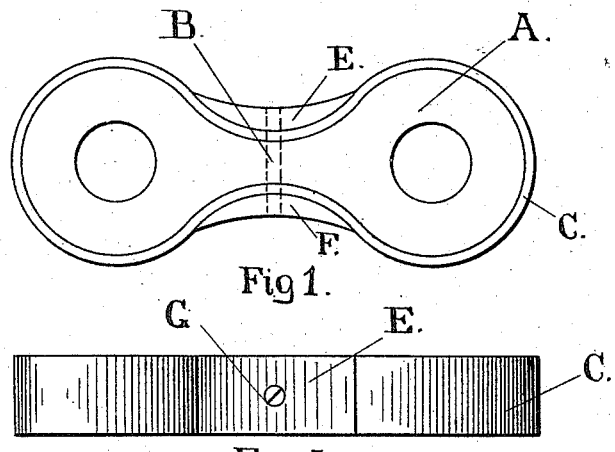
Fig 1.
Fig 5.
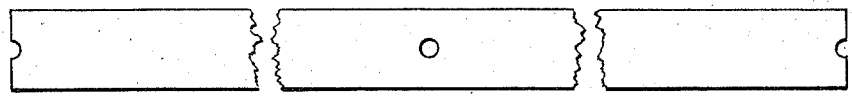
Fig 2.
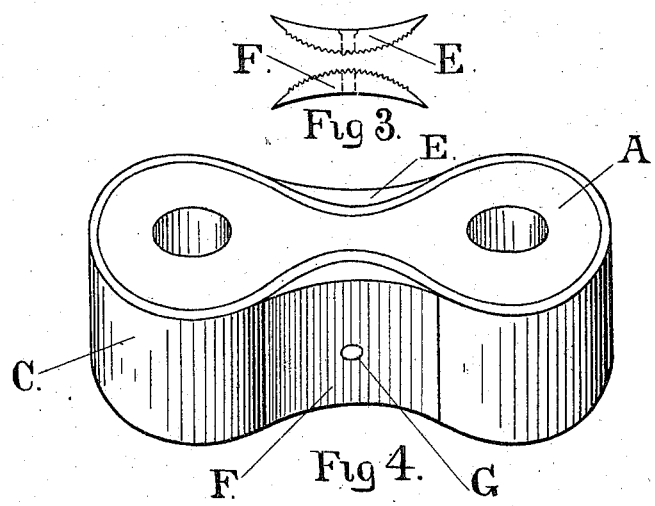
Witnesses.
E. H. Miller
J. M. Gregory
Inventor.
A. W. Gregory

UNITED STATES PATENT OFFICE.

ARTHUR W. GREGORY, OF MORRISTOWN, NEW YORK.

BICYCLE-CHAIN.

SPECIFICATION forming part of Letters Patent No. 575,477, dated January 19, 1897.

Application filed June 23, 1896. Serial No. 596,663. (No model.)

*To all whom it may concern:*

Be it known that I, ARTHUR W. GREGORY, a citizen of the United States, residing at Morristown, in the county of St. Lawrence and State of New York, have invented a new and useful Improvement in Bicycle-Chains and Method of Making Same, of which the following is a full, clear, and exact description.

This invention has for its object the production of a new and improved chain designed for use upon bicycles and other similar machines, which chain is strong, durable, noiseless, and clean, and which requires no lubrication, thereby eliminating the objectionable features of such chains as are at present commonly in use for propelling bicycles.

The invention consists principally of a piece of rawhide interposed at the points of contact between the chain and the sprocket-wheel.

The invention also consists of a modification in the structure of the inside link or block-link of the ordinary bicycle-chain and in the method of applying the rawhide and securing the same to said inside link, all of which will be fully described hereinafter and pointed out in the claims.

Reference is to be had to the accompanying drawings, forming part of this specification, in which similar characters of reference indicate corresponding parts in all the views.

Figure 1 is a view, side elevation, of the improvement complete. Fig. 2 represents a strip of rawhide of the same width as the inside link of chain, slightly shorter than the greatest perimeter of the link and from one thirty-second to one-sixteenth of an inch in thickness, perforated at the center to accommodate the screw or bolt which connects plates E and F. Fig. 3 is a side view of plates E and F. Fig. 4 is a perspective view of improvement complete.

The improvement in bicycle-chains consists in a chain having an inside link A somewhat shorter between its extreme points relatively to the outside link or side plates than those at present in use, such shortening of the link being for the purpose of obtaining space for the rawhide hereinafter mentioned, which inside link has a hole B to admit the passage of a screw or bolt, such hole being in the center of said inside link and perpendicular to the plane of the rivets by which the links of the chain are connected. This inside link is surrounded longitudinally by a thin strip of rawhide C, covering all points of contact with the sprocket-wheels, held in place and caused to conform to the shape of the link by the plates E and F.

The plate E, which is used to cover the ends of the rawhide strip and hold the same in place, is spiked, toothed, or otherwise roughened upon its under surface in order to cause it to hold more firmly to the rawhide, against which it is drawn by a screw or bolt G, which screw or bolt passes through said plate E and also through the hole in link heretofore mentioned and into or through the plate F. The plate F serves as a nut for the connecting screw or bolt and also serves to cause the rawhide to conform to the contour of the link.

The rawhide used in the manufacture of the improved bicycle-chain has had the hair removed by any process that will not injure the fiber or texture of the skin nor remove the natural oil or other animal substances therein contained.

In applying the rawhide to the link the material is first softened and rendered pliable by soaking in water. It is then cut to the required size by knife-shears or die perforated for screw or bolt and pressed round the link with the fingers or by other means. The plate E is then pressed into place and the screw or bolt inserted. The plate F is then pressed into place and the screw or bolt tightened.

My invention is not restricted to the precise method of applying the rawhide herein described, as it may be applied and held in place by a variety of means, such as wires passing through the hole in link, staples passing through both rawhide and link, bands surrounding the link, or even by sewing or tying upon the link, as was actually my method of experiment to test the durability of the material.

The advantages claimed for my improved chain are noiselessness, secured by having the shock of contact between chain and sprocket fall upon a non-resonant substance; cleanness, secured by avoiding the use of all lubricants, the natural oil contained in the rawhide being sufficient to reduce the friction to a minimum, but not of such a nature as to cause dust and dirt to adhere to the chain or to soil the clothing of the rider; improved appearance, secured by cleanness, and further secured by coating with varnish such parts of the rawhide as are visible and not subjected to contact with the sprockets.

The varnish renders the rawhide clear and gives it the appearance of celluloid, varying through all degrees of translucency to transparency.

Having thus described my invention, I claim as new and desire to secure by Letters Patent—

1. A link for a chain, and a covering of rawhide applied thereto, combined with blocks applied to opposite sides of the link to hold the covering in position, and a fastening bolt or screw which is passed through the parts to hold them in position, substantially as shown.

2. A link for a bicycle-chain, and a covering of rawhide applied thereto, combined with clamping-blocks secured to opposite sides of the link, and curved upon their inner sides so as to conform to the shape of the link and hold the covering in close contact therewith, and a screw-rod which is passed through the parts to secure them together, substantially as described.

3. A link for a bicycle-chain, and a covering of rawhide applied thereto, combined with blocks applied to opposite sides of the link, and which blocks conform to the shape of the link and have roughened sides, and a screw for securing the parts together, substantially as set forth.

ARTHUR W. GREGORY.

Witnesses:
  A. S. CARTER,
  J. M. GREGORY.